Aug. 1, 1933.    E. A. MURPHY    1,920,269
PACKING UNIT
Filed Dec. 10, 1930
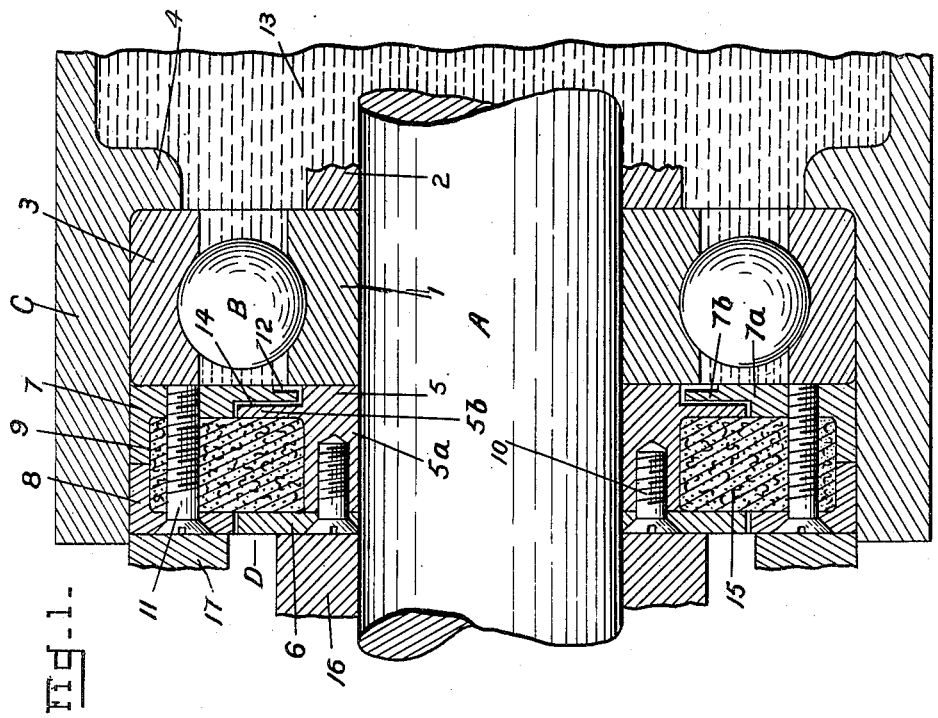
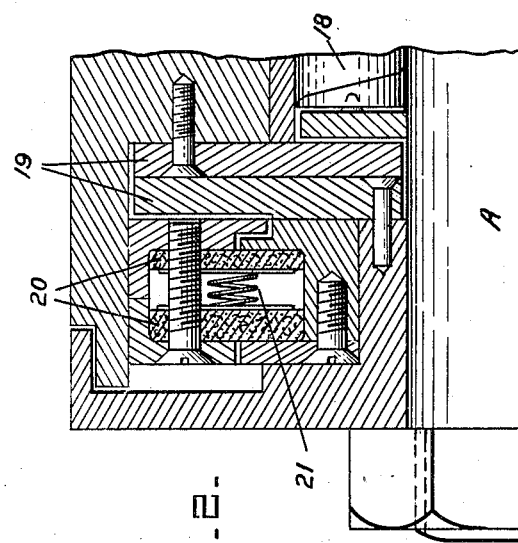
INVENTOR.
Edward A. Murphy
BY
W. N. Roach
ATTORNEY Patented Aug. 1, 1933

1,920,269

UNITED STATES PATENT OFFICE 1,920,269

PACKING UNIT

Edward A. Murphy, United States Army, Raritan Arsenal, Metuchen, N. J.

Application December 10, 1930. Serial No. 501,328

4 Claims. (Cl. 286—5.)

(Granted under the Act of March 3, 1883, as amended April 30, 1928; 370 O. G. 757)

The invention described herein may be manufactured and used by or for the Government for governmental purposes without the payment to me of any royalty thereon.

The subject of this invention is a packing unit.

Considerable difficulty has heretofore been experienced in confining a lubricant to a rotating member such as an axle or wheel bearing, and this is especially true, where under severe conditions of usage the packing must also serve to prevent the incursion of foreign matter.

The principal object of the present invention is to provide a simple and efficient packing unit that will permit of ready application and that by the arrangement of its elements will establish a labyrinth type of fluid seal leading to a packed chamber.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein:

Fig. 1 is a longitudinal sectional view through a bearing equipped with the improved packing unit;

Fig. 2 is a similar view showing the application of the invention to a roller bearing.

Referring to the drawing by characters of reference:

There is shown a shaft A, an antifriction bearing unit B on the shaft, and a member C mounted on the bearing unit.

The inner race 1 of the bearing unit B is held on its inner side by a fixed ring 2 which may be a separate spacing sleeve on the shaft or an integral flange thereon. The outer race 3 may be held in a similar manner, a flange 4 being shown.

The races are held on their outer side by a packing unit D which is formed of four annular rings 5, 6, 7 and 8, all of varying cross section but cooperating when assembled in proper relation to establish an annular chamber 9 which is rectangular in cross section.

The rings 5 and 6 are associated with the shaft A and when secured as by means of the screws 10 constitute an externally grooved unit. The ring 5 consists of a relatively wide band 5a embracing the shaft and an external peripheral flange 5b set back a short distance from the edge of the band. The ring 6 is relatively narrow and of the same internal diameter as the ring 5. It is assembled to the outer side of the band 5a and forms a counterpart to the flange 5b.

The rings 7 and 8 are associated with the member C and when secured as by means of screws 11 constitute an internally grooved unit. These rings are preferably angular in cross section and the screws 11 pass through the side walls, being spaced from the rim. The ring 7 is formed with a reduced flange 7a overlapping the flange 5b and the extremity 7b is further reduced so as to avoid interference with the inner race in providing an entry 12 to the reservoir 13 containing a lubricant.

The rings 7 and 8 are spaced at all points from the rings 5 and 6 so that the assemblies may be relatively rotatable without rubbing against each other. Furthermore, the spaced relation between the flanges 5b and 7a establishes a labyrinth passage 14 leading from the reservoir 13 to the chamber 9. A flexible packing 15 of the nature of leather, fiber, cloth or the like is placed in the chamber 9 and secured as a unit to the outside half of the packing unit D by means of the screws 11.

The packing unit D is held in place in any convenient manner depending on the particular application. In the present instance retainers 16 and 17 are shown for respectively holding the inner and outer halves of the unit D.

When all of the members are stationary the lubricant in the reservoir will be prevented from escaping by the packing 15 in the chamber 9.

In operation, considering the member C as being rotatable and the ring 7 and 8 as moving with it, the lubricant bearing against the flange 7a—7b will be under the influence of centrifugal force and will tend to move along the surface to the outer edge. As a consequence the lubricant on the extremity 7b will establish a film across the entry 12 and serve as a barrier to confine the lubricant to the reservoir.

Lubricant that may have been present between the flanges 5b and 7a will likewise tend to move outward along the flange 7a and the motion of rotation of the ring 7 and the motion of the tangentially projected fluid will set up a back pressure and cross currents at the point of change in direction of the passage 14.

Considering the shaft A as the rotatable member, the inner race 1 and the flange 5b produce the same action. The spacing between the rings 6 and 8 is very small and foreign matter will be prevented from entering by the packing 15.

In Fig. 2 the invention is illustrated in connection with a roller bearing 18 and thrust washers 19 interposed between the roller bearing and the packing unit D. The packing 20 is divided so that it may be placed under pressure by spring means 21.

I claim:

1. A packing unit comprising an annular casing formed of relatively rotatable inner and outer sections, the inner section consisting of a ring having a wide rim with an external flange set back from one side thereof, and a narrow ring having the same internal diameter as the wide rim and secured thereto, the outer section consisting of rings angular in cross section to form an internal flange, one of the internal flanges overlapping and spaced from one of the external flanges, screws passing through the internal flanges to secure the rings of the outer section, and a packing within the annular casing and engaged by the screws.

2. A packing unit comprising annular members of different diameters, the member having the larger diameter being internally channelled and the other member being externally channelled whereby an annular chamber is provided when said members are assembled rim to rim, the side of one member overlapping the corresponding side of the other member and spaced therefrom to provide a labyrinth passage having communication with the annular chamber substantially centrally thereof and a packing in the annular chamber covering the rim joints between the annular members.

3. A packing unit comprising annular members of different diameters, the member having the larger diameter being internally channelled and the other member being externally channelled whereby an annular chamber is provided when said members are assembled rim to rim, the side of one member overlapping the corresponding side of the other member and spaced therefrom to provide a labyrinth passage having communication with the annular chamber and a packing in the annular chamber engaging the sides of the channelled members.

4. A packing unit comprising annular members of different diameters, the member having the larger diameter being internally channelled and the other member being externally channelled whereby an annular chamber is provided when the members are assembled rim to rim, a packing within the chamber and covering the rim joints between said members, and spring means for pressing the packing against the sides of said members.

EDWARD A. MURPHY.